Feb. 7, 1967

J. P. WOODS ETAL 3,303,513

TRANSDUCER INDEXING SYSTEM FOR PLAYING BACK
VARIOUS GEOPHYSICAL RECORDINGS

Original Filed March 31, 1961

ATTEST.

*Charles F. Steininger*

BY

INVENTORS
John P. Woods
Tom Prickett Jr.
William M. Mullings
James K. Lyons

*Norbert E. Birch*

ATTORNEY

Feb. 7, 1967   J. P. WOODS ETAL   3,303,513
TRANSDUCER INDEXING SYSTEM FOR PLAYING BACK
VARIOUS GEOPHYSICAL RECORDINGS
Original Filed March 31, 1961   3 Sheets-Sheet 2
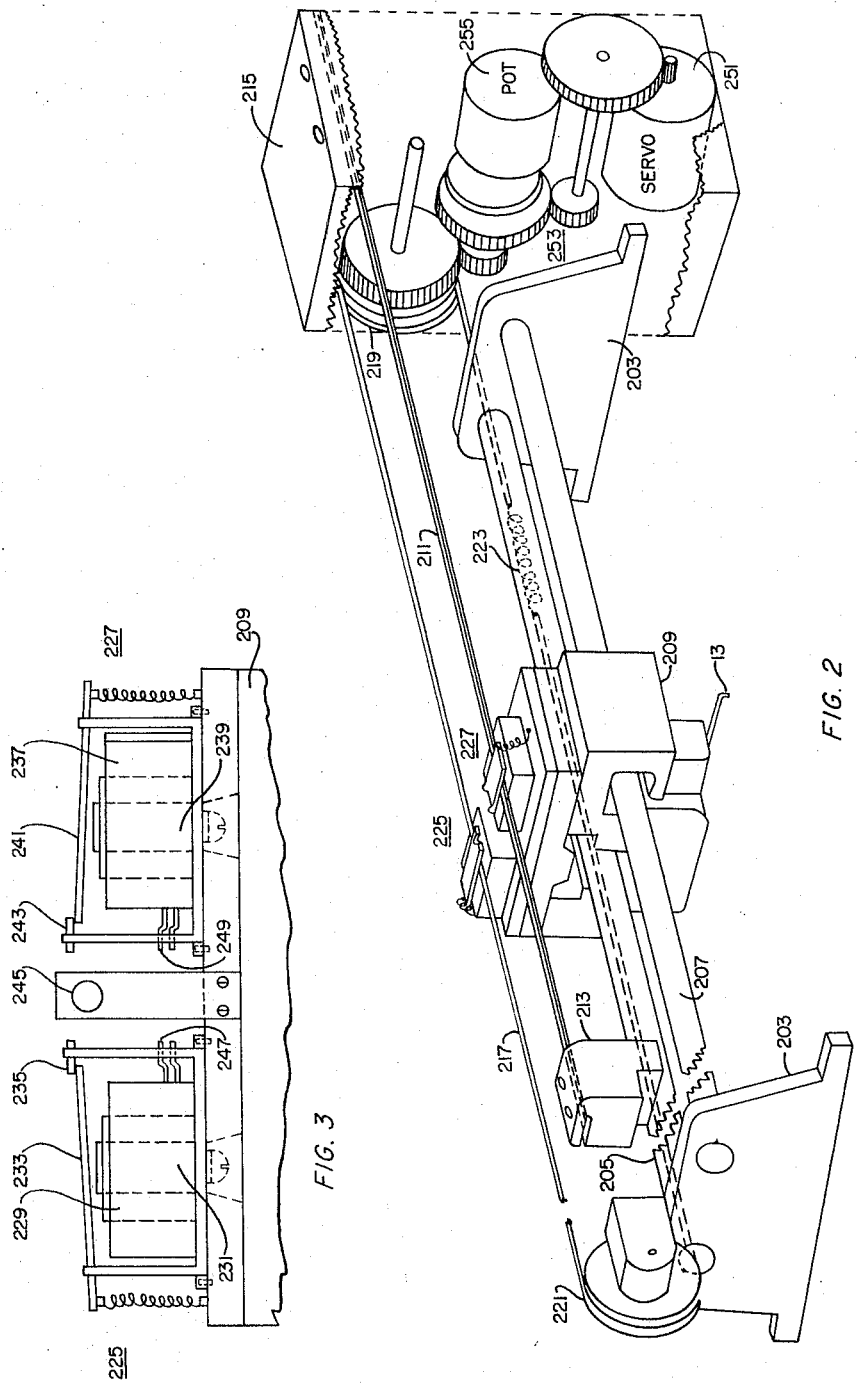
ATTEST
Charles F. Steininger
INVENTORS
J. P. Woods
T. Prickett Jr.
BY
W. M. Mullings
J. K. Lyons
Norbert E. Busch
ATTORNEY United States Patent Office 3,303,513
Patented Feb. 7, 1967

3,303,513
TRANSDUCER INDEXING SYSTEM FOR PLAYING BACK VARIOUS GEOPHYSICAL RECORDINGS
John P. Woods, Dallas, Tom Prickett, Jr., Richardson, William M. Mullings, Garland, and James K. Lyons, Dallas, Tex., assignors to The Atlantic Refining Company, Philadelphia, Pa., a corporation of Pennsylvania
Application Nov. 17, 1964, Ser. No. 417,531, now Patent No. 3,268,910, dated Aug. 23, 1966, which is a division of Ser. No. 348,322, Feb. 25, 1964, now Patent No. 3,210,770, dated Oct. 5, 1965, which in turn is a continuation of Ser. No. 99,858, Mar. 31, 1961. Divided and this application Oct. 23, 1965, Ser. No. 507,987
4 Claims. (Cl. 346—139)

The present case is a divisional application of application Serial No. 417,531, now U.S. Patent 3,268,910 (filed November 17, 1964) which application is in turn a division of application Serial No. 348,322, now U.S. Patent 3,210,770 (filed February 25, 1964), which in turn is a continuation of Serial No. 99,858, filed March 31, 1961, and now abandoned.

This invention relates to a playback system suitable for use with a field or office type geophysical recorder or computer. More specifically, the invention relates to an improved transducer indexing system designed to reproduce seismic records in accordance with requirements peculiar to hydrocarbon exploration and interpretation.

Magnetic recording has been known and utilized for many years; and since World War II, the use of magnetic recording in geophysical exploration has increased at an impressive rate. However, in spite of the rapid increase in the use of magnetic recording in this field, to date no satisfactory recorder-playback combination capable of meeting the peculiar requirements of hydrocarbon exploration has been invented. In the seismic field of geophysical exploration numerous devices are used in an attempt to furnish a field recorder operator with a high speed, economical, and satisfactory visual check or monitoring apparatus for determining the success of the magnetic recorder in capturing seismic reflections in readable form. With a proper monitoring apparatus the operator can quickly determine after each firing if the recordings are satisfactory. If one or more of the channels are not recorded in a readable form, a second shot or series of shots can be fired before the party moves on to its next location. By using the proper monitoring means, the party is able to save thousands of dollars in time, explosives, etc. that would normally be required in "reshooting" positions at later dates. Various display or monitoring systems are used today in conjunction with magnetic recorders to check the readability of recorded signals. Photographic oscillographs, fluorescent screens, and various types of recording pen systems are common devices for providing a visual check of magnetic recording. Probably, one of the most satisfactory answers to the basic monitoring requirement is found in United States Patent No. 2,803,515. This patent discloses a magnetic field recorder and playback combination that simultaneously records a number of seismic signals and thereafter, for monitoring purposes, sequentially, channel by channel, transcribes the recorded seismic signals on Teledeltos paper. The device may be made to repeat the reproduction of any channel by actuating a repeat switch or may be made to return to the start position by actuating a manual reset button. Although the patent provides a satisfactory basic field recording and playback combination, it is not versatile enough to meet the overall requirements of hydrocarbon exploration. Since this type of exploration is highly specialized and complex, the modified conventional type playback or transcribing system as discussed above is not satisfactory. Due to the peculiar requirements of this specialized type of exploration, a desirable playback apparatus, in addition to affording a visual monitoring means, must also provide some type of control means designed to present the transcribed information in a manner suitable for the particular purpose for which the information is to be used. Ideally, this apparatus should also be versatile enough to be used with either a field recorder where the transcribing drum is approximately 8 to 12 inches in length or with a central office computer where the drum is from 4 to 5 feet in length. This extreme variation in drum length imposes severe requirements of flexibility on the pen indexing portion of the playback combination.

First, with reference to the control means requirements mentioned above, it is highly desirable in all hydrocarbon exploration and interpretation operations, and mandatory in some, that the apparatus be versatile enough to (1) be able to select the recorded channels to be transcribed, (2) be able to adjust the width of the transcribed channels, (3) be able to adjust the distance between the edge of the transcribing medium and the first transcribed channel, (4) be able to provide a center gap or an area on the transcribing medium for noting seismic information and computations, (5) be able to adjust the center gap as to width and location, and (6) be able to start and stop the transcribing apparatus at any desired location. The above versatility is utilized, all or in part, either in the field to aid the monitoring operations or in an installation to aid record interpretation operations. The operator in the field, in addition to utilizing the monitoring and control means to check recording quality, uses it to determine the type and quality of filtering required to overcome noise and interference inherent in the area being surveyed. The magnetic channels that he desires to monitor or the number of geophones used in the particular survey will, in most cases, dictate the recorded channels to be transcribed, the width of the edge gap, the width and location of the transcribed channels and the width and location of the center gap. The use of such a versatile playback system is even more essential when the magnetic recordings are utilized in a computer installation. Here, the playback system is used for such operations as transcribing new records received from the field, refiltering the new records, transcribing and refiltering for comparative purposes old records taken in the same area or similar areas, transcribing new or old logs made in the same area, and presenting desired combinations of the above information on the same playback medium for correlation purposes. In accordance with the studies to be made, the different records to be used, and the number of channels to be transcribed, the width of the edge gap, the width of the transcribed channel, and the location and width of the center gap are determined. In addition to the above types of presentation, the playback system must also be able to change previously recorded exploration data into cross sections of the areas previously explored.

In summary, it is obvious that a playback system satisfactory for hydrocarbon exploration and interpretation purposes cannot be one limited to transcribing seismic data in a stereotype form. This is especially true since it is frequently desirable to transcribe seismic information, appropriately recorded well logging information, as well as other types of exploration information, on the same medium so that visual or automatic correlations between the different information can be made. Therefore, a satisfactory playback system must be versatile enough (1) to accommodate itself to operate on various types of recorded information and (2) to transcribing the information in the form that will facilitate interpretating the particular information transcribed.

It is, therefore, an object of this invention to provide a versatile automatic playback system usable with either a field recorder or office computer and incorporating controls so that the transcription can be made in a form suitable to the interested party's needs.

Another object of the invention is to provide an automatic playback means capable of transcribing various types of previously recorded hydrocarbon exploration information in the form best suited to facilitate interpretation of the information.

Another object of the invention is to provide a compact, transportable, and rugged playback unit capable of being utilized either in the field or in an office.

Another object of the invention is to provide a simplified playback system exhibiting a minimum of moving parts and adapted to provide fast accurate records and dependable service under field conditions.

Another object of the invention is to provide a read and/or write element indexing system capable of operating across a computer drum or a field recorder drum.

Another object of the invention is to provide a read and/or write element indexing system that is simple and dependable in operation with a minimum of moving parts.

Another object of the invention is to provide a read and/or write element indexing, clutch-brake assembly adapted to prevent servo-hunt, jitter, backlash, etc., and capable of accurate operation over a long drum or wide chart.

Another object of the invention is to provide a simplified read and/or write element indexing system with a faster response time and more accurate positioning system than heretofore available.

In the drawings:

FIGURE 2 is an isometric drawing of a band-pulley read and/or write element indexing device.

FIGURE 3 is a side view of a magnetic clutch-brake assembly used in FIGURES 2 and 4.

Briefly stated, the preferred form of the invention is concerned with an automatic playback system which utilizes a novel incremental motion type indexing device adapted to operate with a monitor transcriber for a magnetic field recorder or with a transcriber for a large, office type computing device. The novel indexing device is designed for minimum physical wear and simplicity of operation so that it can function in the field or in the office with a minimum of maintenance.

Within the broad statements of the invention as given above, there are numerous combinations and subcombinations of apparatus which are in themselves novel and which will be so recognized.

Figure 1:
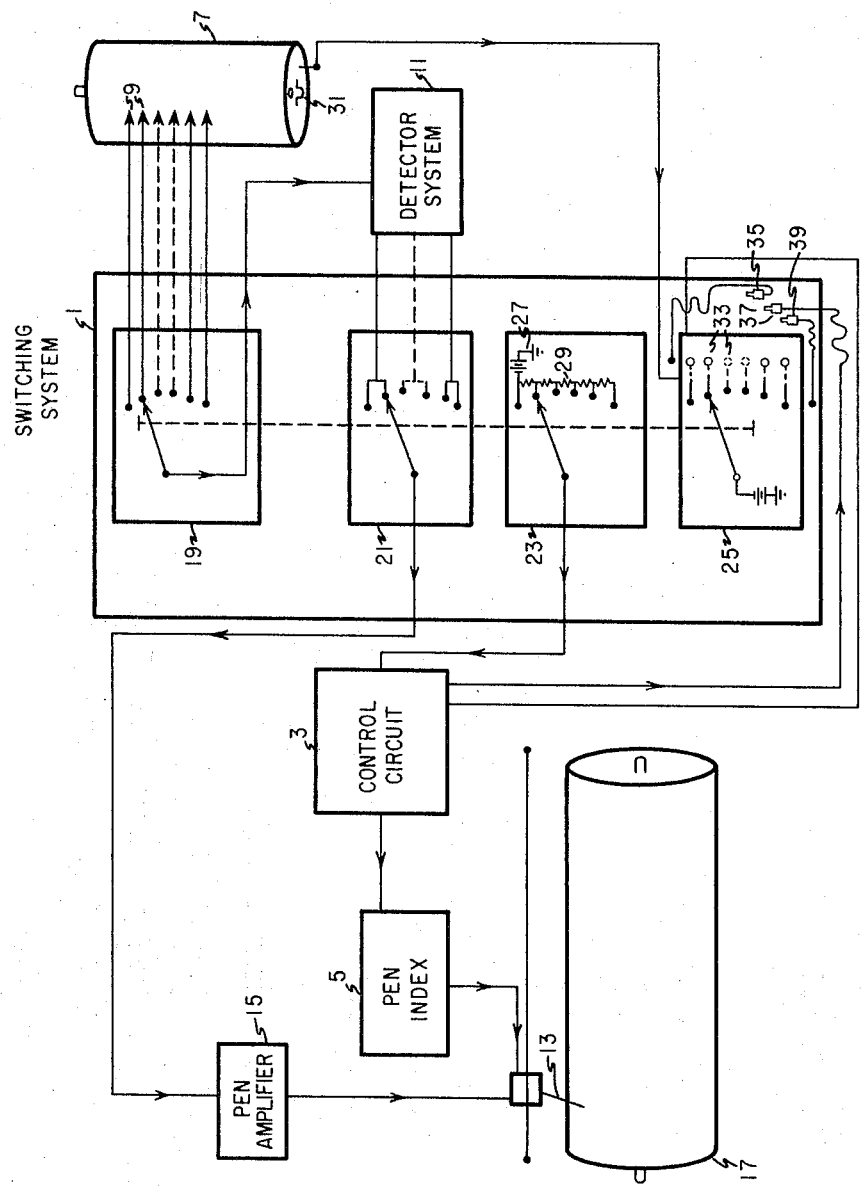
FIGURE 1 is a simplified diagram of a playback system.

FIGURE 1 is a schematic diagram of one possible combination of applicants' invention and conventional recording and transcribing devices. Applicants' invention is shown as pen indexing system 5 associated with playback switching system 1, playback switching control circuit 3, magnetic recording drum 7, magnetic heads 9, detector system 11, transcribing pen 13, pen amplifier 15, and transcribing drum 17.

A further and more detailed description of this embodiment follows.

The basic function of switching system 1 is to automatically and selectively connect read and write means so that previously recorded data are automatically transcribed as directed by instructions set in associated control means 3. The basic function of control means 3 is to command indexing system 5 to position transcribing element 13 so that it reproduces the data in a preselected manner compatible with requirements peculiar to hydrocarbon exploration and interpretation activities. Control means 3 may physically be a part of or separate from switching system 1.

Playback switching matrix 1, FIGURE 1, is shown as a number of ganged sequential multicontact switches 19, 21, 23 and 25. Multicontact switch 19 connects magnetic heads 9 to detector system 11. Multicontact switch 21 connects an output of detector 11 to the input of pen amplifier 15. Multicontact switch 23 connects a voltage source 27 through a resistor system 29 and control circuit 3 to the input of pen indexing means 5. The pen index may include a servo mechanism, a motor drive mechanism, or a simple circuit connected to the device depending upon the type of pen index used. Switch 25 is connected to ramp switch 31 on magnetic recording drum 7 and is designed to be pulsed by each revolution of the drum. Each time switch 25 is pulsed by switch 31, the next succeeding contact on the switch is closed, thus moving 25 and its ganged switches 19, 21 and 23 to their next succeeding contacts. Switch 25 contains receptacles 33 for start patch plug 35, center gap plug 37 and stop plug 39. As will be explained in detail hereinafter, the proper connection of plugs and receptacles bridges the undesired switch contacts and locates the desired center gap on transcribe drum 17.

Figure 4:
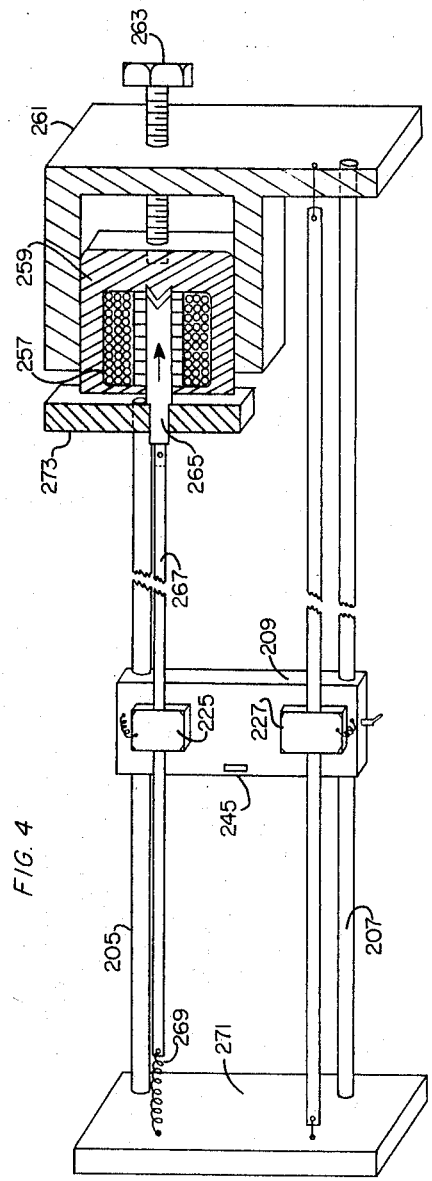
FIGURE 4 is an isometric drawing, partially in section, of a linear motion solenoid read and/or write element indexing device.

Control circuit 3 converts preset transcribing instructions into proper command voltages for the pen index system. As will be detailed hereinafter, the type of pen index used determines the type of control circuit required. If a pulse type indexing device, FIGURE 4 or 5, is used, the control system can be a simple circuit connecting a pulse circuit, such as switch 23, FIGURE 1, to the pen index. Of course, necessary relays and patch cords connections or the like are required, as described hereinafter, to avoid the undesired channels.

Operation of the playback switching matrix and control circuit in FIGURE 1 is as follows. Prior to the playback, the desired transcribe instructions are set in the control circuit. Start plug 35, center gap plug 37, and stop plug 39 are placed in the appropriate receptacles 33. The plug positions determine the magnetic channels to be replayed and the position of the center gap, as will be described in more detail in the matrix subheadings. Any or all of the above instructions may be varied after each transcribing operation or may be retained as long as appropriate.

After the desired adjustments have been made on the control circuit and patch board, the system is then ready for a fire-record-transcribe sequence or a transcribe sequence, depending on the purpose of the playback and the type recorder being used. Assuming that the desired information is already recorded on drum 7, the playback sequence is as follows. The proper magnetic head 9 is selected by the position of switch 19 which in turn is determined by switch 25 and the receptacle 33 in which start plug 35 is inserted. The magnetically recorded intelligence under the selected head is read out and sent through detector systems 11, switch 21, playback amplifier 15 to playback pen 13, where it is transcribed on a medium mounted on drum 17. During this operation, switch 23, which was simultaneously positioned along with 19 and 21, connects D.C. voltage 27 to control circuit 3 where a command voltage is developed. This command voltage causes pen index 5 to position playback pen 13 over an appropriate transcribe channel on drum 17. As playback pen 13 completes the transcription of the selected magnetic channel, drum 7 completes a single revolution causing pen shift ramp switch 31 to close producing a D.C. pulse. The D.C. pulse causes switch 25 to move to its next succeeding contact. If the succeeding contact is bridged by center gap plug 29, the next selected contact is activated. Since switch 25 is ganged to 19, 21 and 23, the appropriate contact on each switch is activated and the recorded information from the next selected magnetic head is transcribed on drum 17. This operation is repeated until the contact on switch 25, selected by stop plug 39, is energized. At that time, the D.C. pulse from the recording drum is short-circuited to ground, all switch contacts are cleared, and the playback sequence is complete.

The pen indexing device 5, FIGURE 1, is designed to position playback pen 13 over the appropriate transcribe channel on drum 17, as directed by the playback switching matrix 1 and control circuit 3. The type of control circuit used depends on the type of indexing device utilized. If it is desirable to use a servo-driven indexing device, a control circuit is used to develop a command voltage to operate the pen index. As will be detailed hereinafter, the command voltage can be used to operate the servo in novel incremental steps or the command voltage can be compared with a second voltage to produce an error signal to operate a conventional servo indexing system. If the pen indexing mechanism is not servo-driven, the control circuit is modified accordingly. The novel pen indexing mechanisms to be described hereinafter are not limited in their operation and can be used on a field recorder or an office computer with equal accuracy. In addition, they are well suited for automatic, semiautomatic or manual operation, with or without a switching matrix. Although the index mechanisms are illustrated and described as pen indexing devices, it should be understood that if desired they can be used to position any type of read and/or write transducer or transducers to include magnetic heads, electric pens, ink pens, optical readout systems, etc.

Heretofore, most pen indexing systems have used servo-operated lead screws to position a read or write element over a desired portion of a drum or chart. The servo was operated by a conventional error voltage and rotated the lead screw until the error voltage was zero. It is well known that when such a servo mechanism is required to operate over a considerable linear distance the system loses much of its accuracy. In fact, when a conventional servo indexing device is used to move a pen housing over a distance greater than 12 inches, the problem of inaccurately located playback channels, etc., becomes serious. Applicants' novel invention has solved this problem by developing pen indexing devices capable of operating over distances much greater than 12 inches and still retaining a high degree of accuracy in locating the playback channels. Applicants' pen indexing devices, when operating over long drums, utilize an incremental stepping system which retains the high degree of accuracy inherent in a servo system operating over a few inches, and yet reduces the response time of such a system by a factor of two or three, depending on the particular species used. This feature will be explained in detail hereinafter. In addition to maintaining accuracy and reducing response time, applicants' devices overcome the problems of jitter, backlash, and servo-hunt by the use of a novel brake and clutch arrangement.

*Band-pulley pen indexing mechanism*

FIGURE 2 shows an isometric drawing of a servo-operated band-pulley pen indexing device that can operate over short or long distances with great accuracy and speed. Servo-hunt and jitter are prevented by a unique brake-clutch arrangement shown in FIGURE 3. In addition to its operational versatility, the device is simple in operation, construction, and maintenance. The band-pulley mechanism retains its high degree of accuracy by using a limiting potentiometer and a servo drive to produce incremental linear motion.

The band-pulley indexing system shown in FIGURE 2 includes frame 203 which is joined by tubular ways 205 and 207. Pen housing 209 is slidably mounted on the tubular ways. A stationary metallic band 211 is connected between anchor support 213, rigidly attached to way 205 and to gear housing 215. A rotating metallic band 217 is mounted on driving pulley 219 and driven pulley 221 so that the lower portion of the band passes through the center of tubular way 205. The two ends of band 217 are joined by spring 223. Band 217 passes through magnetic clutch 225 and band 211 passes through magnetic brake 227. The magnetic clutch brake assembly is described in detail under its appropriate subheading; however, for purpose of illustrating FIGURE 5, it is necessary to make a brief reference to the assembly as shown in FIGURE 3. Magnetic clutch 225 includes solenoid 229 with center core 231 mounted under spring-loaded rocker arm 233. When no current is applied to solenoid 229, rocker arm 233 rests against stop 235. Band 217, FIGURE 2, is positioned between rocker arm 233 and core 231, FIGURE 3. Magnetic brake 227, FIGURE 3, includes solenoid 237 with center core 239, spring-loaded rocker arm 241 and stop 243. Band 211, FIGURE 2, is positioned betwen rocker arm 241 and core 239, FIGURE 3. If desired, microswitch 245, FIGURE 3, can be connected to the electrical inputs 247 on clutch 225 and 249 on brake 227. When 245 is depressed, actuating current is interrupted and both rocker arms return or remain in the open position so that the pen housing can be manually moved along the ways 205 and 207, FIGURE 2.

In operation, servo 251 receives a command signal voltage from control circuit 3 shown in FIGURE 1. Simultaneously with the application of the command voltage, a voltage is applied to the inputs of the clutch and brake assembly. This voltage activates solenoid 229, rocker arm 233 to drive band 217, and de-activates solenoid 237 so that band 211 is free to move under rocker arm 241. Servo 251 translates the command voltage to rotary motion in a conventional manner and transmits this motion through its gear train 253 to pulley 219 which in turn imparts linear motion to band 217. Since clutch 225 is now activated and rocker arm 233, FIGURE 3, is secured to the band 217, FIGURE 2, pen housing 209 is moved along ways 205 and 207 as pulley 219 rotates and moves band 217 in the desired direction. The linear movement imparted to the pen housing is determined by the command voltage applied to the servo. After the pen housing has been indexed to the next appropriate playback channel, the activating voltage from the playback control relay is discontinued and the clutch is de-activated releasing band 217. If desired, an appropriate signal can be applied to brake 227 so that it is activated between command voltages, however, this is an optional feature. After transcribing pen 13 has recorded the appropriate information, a switching matrix, such as shown in FIGURE 1 causes the command circuit to send the next command voltage to the servo. The pen housing is moved over the next transcribing channel in the same manner as described above.

As pointed out heretofore, the mechanism's incremental movement is developed by turn limit potentiometer 255. The maximum amount of linear motion that can be applied to the pen housing without a reset cycle is determined by the turn limit potentiometer. Various types of limiting potentiometers may be used, however, a three or ten turn limit is most desirable with this device. In most cases, it is desirable to untilize a limit potentiometer that allows an incremental motion greater than the total width of the magnetic record to be played out. After this maximum linear distance has been traversed by the pen housing, the potentiometer must experience a reset cycle before the housing can continue its linear motion across the drum. The reset cycle in this case comes from the relay receptacle 33, FIGURE 1, in which the stop plug has been inserted. During the reset cycle, magnetic clutch 225, FIGURE 2, is de-activated and brake 227 is activated so that when the servo rewinds the turn limit potentiometer the pen housing remains in its present posion.

The term "band" as used herein is meant to include bands, belts and chains whether composed of metal or otherwise. Also, it should be understood that other motion transmitting means can be substituted for the band-pulley means without changing the scope of the invention.

For instance, a lead screw or a "Saginaw" ball-bearing drive screw or even a push bar could be used for the motion imparting means. If a drive screw is substituted for the band-pulley means, modifications would be necessary A clutch positioned between the servo drive and the drive screw could be substituted for the magnetic clutch-brake assembly. The substituted clutch could be operated by a limit switch actuated by a turn limit potentiometer connected to the screw. With this adaptation, the servo would drive the lead screw imparting linear motion to the pen housing attached to the screw. After the pen housing traversed the incremental distance prescribed by the turn limit potentiometer, the limit switch is activated, in turn engaging the clutch so that the screw drive is disengaged during the period that the servo rewinds the turn limit potentiometer.

FIGURE 3 shows a magnetic clutch and brake assembly designed to be used with a pen indexing device. This assembly enables the transcribing element to be more accurately positioned by preventing jitter, servo-hunt, backlash, etc. The errors introduced by servo-hunt, jitter, backlash, etc., are prevented by the automatic operation of the clutch and the brake during the positioning and transcribing operations, as will be detailed hereinafter. In addition, when the clutch-brake assembly is used with a servo-driven indexing device, it introduces more accuracy into the over-all system than is otherwise possible. It is well known to one skilled in the art that a servo system can be designed to linearly position an item within an accuracy of approximately one-half percent. Consequently, if the pen indexing device is operated over a distance of, say, four to five feet, the length of a conventional seismic office computer drum, the one-half percent error in locating the pen is significant. However, if the device is operated through a series of short steps by the use of a turn limit potentiometer, or the like, as described in the band-pulley paragraph, the error is only the sum of one-half percent of each of the short distances traveled. This amounts to a considerable decrease in the over-all error.

Regardless of the type of pen indexing system utilized, the clutch is used to engage a motion imparting means, be it band, rod, screw, etc., and the brake, if utilized, is used to engage a stationary means.

The magnetic brake-clutch assembly, FIGURE 3, as used in FIGURES 2 and 4, can include two modified relays mounted on a pen housing, or the like, and electrically connected through a microswitch or other controlling means. If relays are used as clutch 225 and brake 227, they are modified so the relay contacts are not utilized. Clutch 225 includes solenoid 229, core 231, spring-loaded rocker arm 233 and stop 235. Brake 227 includes solenoid 237, core 239, spring-loaded rocker arm 241 and stop 243. The clutch is designed so that rocker arm 233 rides over a motion imparting means and the brake is designed so that rocker arm 241 rides over a stationary means. The operation of the clutch-brake assembly is simple and effective in operation. When the pen housing 209 is being positioned by the motion imparting means, the clutch's rocker arm is firmly clamped against the means by the activation of solenoid 229. The brake's rocker arm allows the stationary means to be passed freely under it since its solenoid is not activated. When the pen housing has been indexed a preselected distance, depending on the type of system used, the clutch is de-activated and, if desired, the brake is activated. The de-activation of the clutch prevents the driving means from moving the housing until the clutch is re-activated. The brake may or may not be required depending on the type of index system used. If a device, such as shown in FIGURE 2, is used, the brake should at least be activated during the time the turn limit potentiometer is rewound; however, if a screw drive modification of FIGURE 2, as discussed in the same subheading, is used, a brake is not necessary. If a device such as shown in FIGURE 4 is utilized, a brake should be used and applied at least during the times the plunger is returning to its de-activated position.

*Linear motion solenoid pen indexing device*

FIGURE 4 shows an isometric drawing, partially in section, of a linear motion solenoid pen indexing device in which the incremental motion is incorporated to insure accuracy in positoining the pen housing. The motion imparting means is the ultimate in simplicity of operation and construction and yet maintains a high degree of accuracy. The device consists of a conventional solenoid 257 mounted in housing 259 positioned within frame 261 by set screw 263. Solenoid plunger 265 is slidably positioned inside solenoid 257 and connected to band 267 which in turn is connected through spring 269 to frame 271. Frame element 273 prevents spring-loaded band 267 from pulling the plunger from its position inside the solenoid. Set screw 263 determines the travel distance or the gap between the plunger and the housing. Second band 275 is connected between frames 271 and 261. Pen housing 209 mounting magnetic clutch 225 and magnetic brake 227 and traveling on ways 205 and 207 can be the same as shown in FIGURE 2. This device can receive its command voltage and magnetic brake-clutch voltages directly from the switching matrix pulse circuit, such as shown in FIGURE 1. Therefore, when this type of index is used, control circuit 3, FIGURE 1, is simplified considerably. Set screw 263, FIGURE 4, is utilized to adjust plunger travel distance and, therefore, the interval between transcribing channels on drum 17, FIGURE 1. A stepping switch, not shown, can be used in conjunction with the pulse circuit to step the pen housing to the desired position without the use of the pulse circuit. In addition, the pen housing can be manually freewheeled to the desired position by the use of microswitch 245.

In operation, previously described brake-clutch signal voltages de-activate the brake and activate the clutch. Simultaneously, a command voltage reaches solenoid 257 and a magnetic field is set up in a direction to pull the plunger into the solenoid until it strikes housing 259. The amount of plunger travel and linear motion applied to band 267 is determined by the setting of screw 263. Since the clutch now grips band 267 and brake 227 does not grip band 275, the linear movement applied to band 267 also moves the pen housing. After the movement of the plunger is stopped by housing 202, the clutch is de-activated and the brake is activated by reversing the signals from the relay control circuit. When the command voltage is terminated, solenoid 257 is de-energized, allowing spring 269 to pull the band and plunger to their original position. However, the pen carriage does not follow the band movement rearward since the brake is now holding the pen housing to fixed band 275 and the clutch allows its band to move under its rocker arm. This stepping procedure is repeated during the transcribing cycle until all the selected magnetic channels have been reproduced. When patch plugs 35, 37, and 39, FIGURE 1, in the playback switching matrix are arranged so that one or more channels are omitted, solenoid 257, FIGURE 4, receives an appropriate number of pulses to move the pen housing over the omitted channels.

The indexing system can be made bidirectional by reversing the functions of the clutch and brake. When the functions are reversed, the pen moves under the influence of spring 269 instead of plunger 265.

While there have been disclosed herein several specific preferred embodiments of the present invention, various modifications, omissions and refinements which depart from the disclosed embodiments may be adopted without departing from the spirit and scope of the present invention whch is limited only by the following claims.

What is claimed is:

1. A band pulley pen indexing device, comprising,
   (a) a frame member,
   (b) first and second tubular ways supported by said frame member,
   (c) a pen housing slidably mounted on said tubular ways, (d) at least one pen carried by said pen housing,
(e) gear means fixed to one end of said frame member,
(f) an anchor support rigidly attached to said first tubular way near the end of said frame member remote to said gear means,
(g) a first pulley associated with and attached to said gear means,
(h) a second pulley mounted on the end of said frame member remote to said gear means,
(i) a continuous band mounted on said first and second pulleys so that a portion thereof passes through said first tubular way,
(j) a connecting band joining said gear means and said anchor support,
(k) a magnetic clutch mounted on said pen housing and adapted to engage said continuous band, and
(l) a magnetic brake mounted on said pen housing which is adapted to engage said connecting band.

2. In a device as set forth in claim 1, wherein a turn limit potentiometer is associated with and attached to said gear means.

3. In a device as set forth in claim 2, wherein a servo motor operates said gear means.

4. A linear motion, solenoid pen indexing device, comprising,
(a) a frame member having opposed terminal portions,
(b) at least two traveling ways connecting said terminal portions,
(c) a pen housing slidably mounted on said traveling ways,
(d) at least one pen carried by said pen housing,
(e) a movable housing slidably mounted on one terminal portion of said frame member,
(f) a solenoid including a plunger and a coil adapted to fit within said movable housing,
(g) positioning means for locating said movable housing relative to said frame member,
(h) spring means connected to the terminal portion of the frame member opposed to said movable housing,
(i) a first band connected to the plunger of said solenoid and to said spring means,
(j) stop means to keep said plunger within its position within said solenoid,
(k) a second band connected between the terminal portions of the frame member,
(l) a magnetic clutch mounted on said pen housing and adapted to engage said first band, and
(m) a magnetic brake mounted on said pen housing and which is adapted to engage said second band.

References Cited by the Examiner
UNITED STATES PATENTS

| | | | |
|---|---|---|---|
| 1,163,280 | 12/1915 | Stevens | 346—33 X |
| 2,387,563 | 10/1945 | Schapple | 346—49 |
| 2,626,979 | 1/1953 | Woods | 346—139 X |
| 2,847,859 | 8/1958 | Lynott | 74—37 |
| 2,926,984 | 3/1960 | Gerbrands | 346—139 |

RICHARD B. WILKINSON, *Primary Examiner.*

J. W. HARTARY, *Assistant Examiner.*